United States Patent
Hirschmann et al.

(10) Patent No.: US 6,655,518 B2
(45) Date of Patent: Dec. 2, 2003

(54) HOUSING ARRANGEMENT FOR A PRESSURE PLATE ASSEMBLY, PRESSURE PLATE ASSEMBLY FOR A FRICTION CLUTCH

(75) Inventors: Frank Hirschmann, Niederwerrn (DE); Hubert Tremer, Sulzthal (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/969,983

(22) Filed: Oct. 3, 2001

(65) Prior Publication Data

US 2002/0040838 A1 Apr. 11, 2002

(30) Foreign Application Priority Data

Oct. 7, 2000 (DE) .......................................... 100 49 650

(51) Int. Cl.[7] .............................................. F16H 13/58
(52) U.S. Cl. ...................... 192/110 R; 192/112; 74/573
(58) Field of Search .......................... 192/110 R, 70.25, 192/112; 94/573 R

(56) References Cited

U.S. PATENT DOCUMENTS

| | | | | |
|---|---|---|---|---|
| 4,611,702 A | * | 9/1986 | Kayakabe et al. | ...... 192/110 R |
| 4,778,040 A | * | 10/1988 | Kabayama | ............... 192/110 R |
| 4,890,706 A | * | 1/1990 | Miura et al. | ................ 192/3.28 |
| 5,415,259 A | * | 5/1995 | Martin | ....................... 192/58.2 |
| 5,762,558 A | * | 6/1998 | Takehira | ....................... 464/68 |
| 5,906,258 A | * | 5/1999 | Kimura et al. | .......... 192/110 R |
| 6,039,163 A | * | 3/2000 | Bassett et al. | .......... 192/110 R |
| 6,123,180 A | * | 9/2000 | Weidinger | ............... 192/70.25 |
| 6,168,402 B1 | * | 1/2001 | Kawada | ..................... 418/55.1 |

FOREIGN PATENT DOCUMENTS

| | | | | |
|---|---|---|---|---|
| GB | 2217798 A | * | 11/1989 | ........... F16D/13/75 |

* cited by examiner

Primary Examiner—Charles A Marmor
Assistant Examiner—Eric M. Williams
(74) Attorney, Agent, or Firm—Cohen, Pontani, Lieberman & Pavane

(57) ABSTRACT

On a housing for a pressure plate assembly of a friction clutch, at least one mass part is provided, especially a motion stop for a clearance-producing arrangement of the pressure plate assembly provided for detecting wear. An imbalance-compensating formation is provided on the housing, which compensates essentially completely for at least the one imbalance introduced by the at least one motion stop.

6 Claims, 4 Drawing Sheets

HOUSING ARRANGEMENT FOR A PRESSURE PLATE ASSEMBLY, PRESSURE PLATE ASSEMBLY FOR A FRICTION CLUTCH

BACKGROUND OF THE INVENTION

1. Field of the Invention

The present invention pertains to a housing arrangement for a pressure plate assembly of a friction clutch, where at least one mass part, especially a motion stop for the clearance-producing arrangement of the pressure plate assembly provided to detect wear, is provided on the housing arrangement.

2. Description of the Related Art

A pressure plate assembly for a friction clutch with this type of housing arrangement is known from, for example, from U.S. Pat. No. 6,123,180. A motion stop is attached to a circumferential point of the housing arrangement of this pressure plate assembly. The connection can be a screwed connection using threaded bolts, for example. The motion stop can be stamped out of sheet steel, like the housing arrangement or housing component itself. As a result of the attachment of this motion stop, especially by means of a threaded bolt, an imbalance is introduced in the area of the housing arrangement or the entire pressure plate assembly, which results in particular from the fact that no appropriate compensation is provided in the form of several similar motion stops positioned symmetrically around the circumference.

SUMMARY OF THE INVENTION

It is the task of the present invention to ensure that, while a housing arrangement of this type or a pressure plate assembly equipped with this type of housing arrangement is operating in rotational mode, undesirable oscillations are not created by unbalanced masses.

According to the present invention, this task is accomplished by a housing arrangement for a pressure plate assembly of a friction clutch, where at least one mass part, especially a motion stop for the clearance-producing arrangement of the pressure plate assembly provided to detect wear, is provided on the housing arrangement.

It is also provided that an imbalance-compensating formation is provided on the housing arrangement, which formation compensates essentially completely for at least the imbalance introduced by the minimum of one mass part.

By means of the present invention, therefore, a housing arrangement is obtained which, as a result of its built-in imbalance compensation formation, ensures that the assembly created by attaching the housing arrangement to the motion stop is essentially already without any imbalance in and of itself as soon as the minimum of one mass part, e.g., a motion stop, is attached. This means that it is no longer necessary for other assemblies of a pressure plate assembly to be designed to compensate for imbalances in the area of the housing arrangement. In particular, it is no longer necessary to compensate for imbalances by installing some sort of compensating measures on the pressure plate of the pressure plate assembly, and thus the elements usually used to connect a pressure plate of this type to the housing arrangement, e.g., elements such as tangential leaf springs, do not have to be designed to transmit significant amounts of force to correct for imbalances.

For example, it can be provided that the minimum of one mass part comprises a blocking element attached to the housing arrangement. In the present invention, it is also preferable for the housing arrangement to be essentially ring-shaped, the radially outer area of the ring being designed to be attached to a centrifugal mass arrangement. This housing arrangement has a pass-through opening to allow a release mechanism to interact with a stored-energy device, where the imbalance-compensating formation is provided essentially by giving this pass-through opening an appropriate shape. Because a housing arrangement of this type can usually be produced by stamping and bending a piece of sheet steel, it is ultimately possible to obtain a housing arrangement of this type with the required mass distribution without the need for additional machining or installation steps; that is, it is sufficient merely to give the pass-through opening an appropriate design or shape to arrive at a mass distribution which, after the motion stop, for example, has been attached, ensures that the assembly is essentially free of imbalance, in which assembly the formation serving to compensate for the imbalance ultimately constitutes an integral part of the housing arrangement itself.

To arrive at a mass distribution able to compensate for the imbalance introduced by a mass part, it is proposed that the pass-through opening have a shape which is neither rotationally symmetric nor radially symmetric relative to the rotational axis of the housing. It is possible, for example, for the pass-through opening to have the approximate form of a segment of a circle.

The present invention also pertains to a pressure plate assembly for a friction clutch, where the pressure plate assembly has a housing arrangement according to the invention; a pressure plate held in the housing arrangement with the freedom to move in the direction of a rotational axis; a stored-energy device; a wear-compensating device located essentially on the pressure plate in the path of force transmission between the stored-energy device and pressure plate, where the wear-compensating device has at least one adjusting element which can move in an adjusting direction to compensate for wear; and at least one clearance-producing arrangement, which cooperates with at least one motion stop mounted on the housing to detect wear.

To make sure that no excessive imbalance-compensating forces need to be transmitted in a pressure plate assembly of this type, especially in the area of the elements which provide the friction-locking connection between the pressure plate and the housing arrangement, it is also proposed that a first assembly comprising the housing arrangement with the minimum of one motion stop and a second assembly comprising the pressure plate with the wear-compensating device and the minimum of one clearance-producing arrangement be designed essentially without any imbalance in and of themselves.

Because, even during the assembly of a pressure plate assembly of this type, there is always the danger that certain residual imbalances will be present as a result of manufacturing tolerances, it is proposed that the pressure plate assembly be balanced to compensate essentially completely for any residual imbalance which may be present after the components of the first assembly have been attached to the components of the second assembly.

The present invention also pertains to a friction clutch in which a housing arrangement according to the invention or a pressure plate assembly according to the invention is provided.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
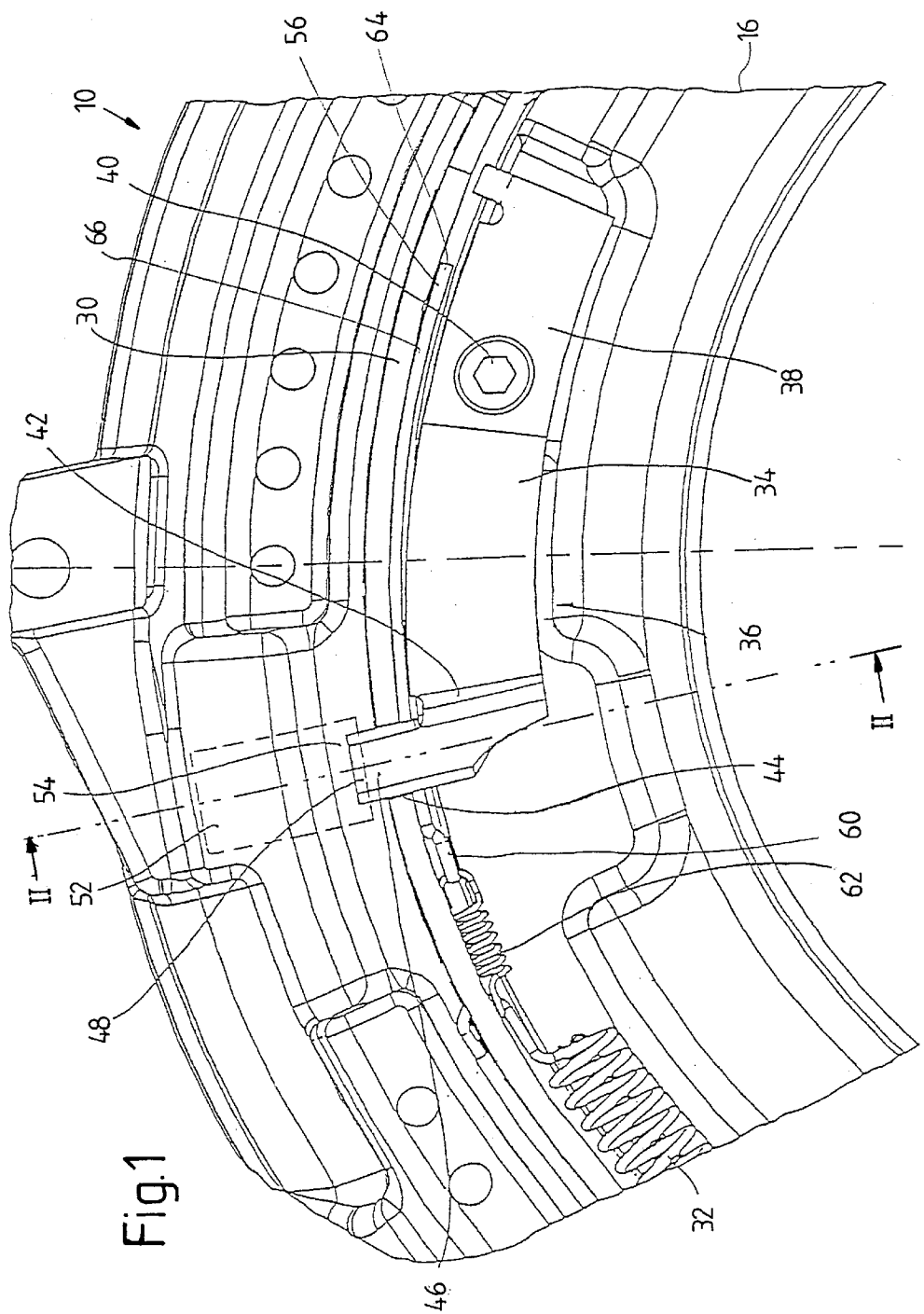
FIG. 1 is a partial axial view of the essential components of a pressure plate assembly according to the invention.
Figure 2:
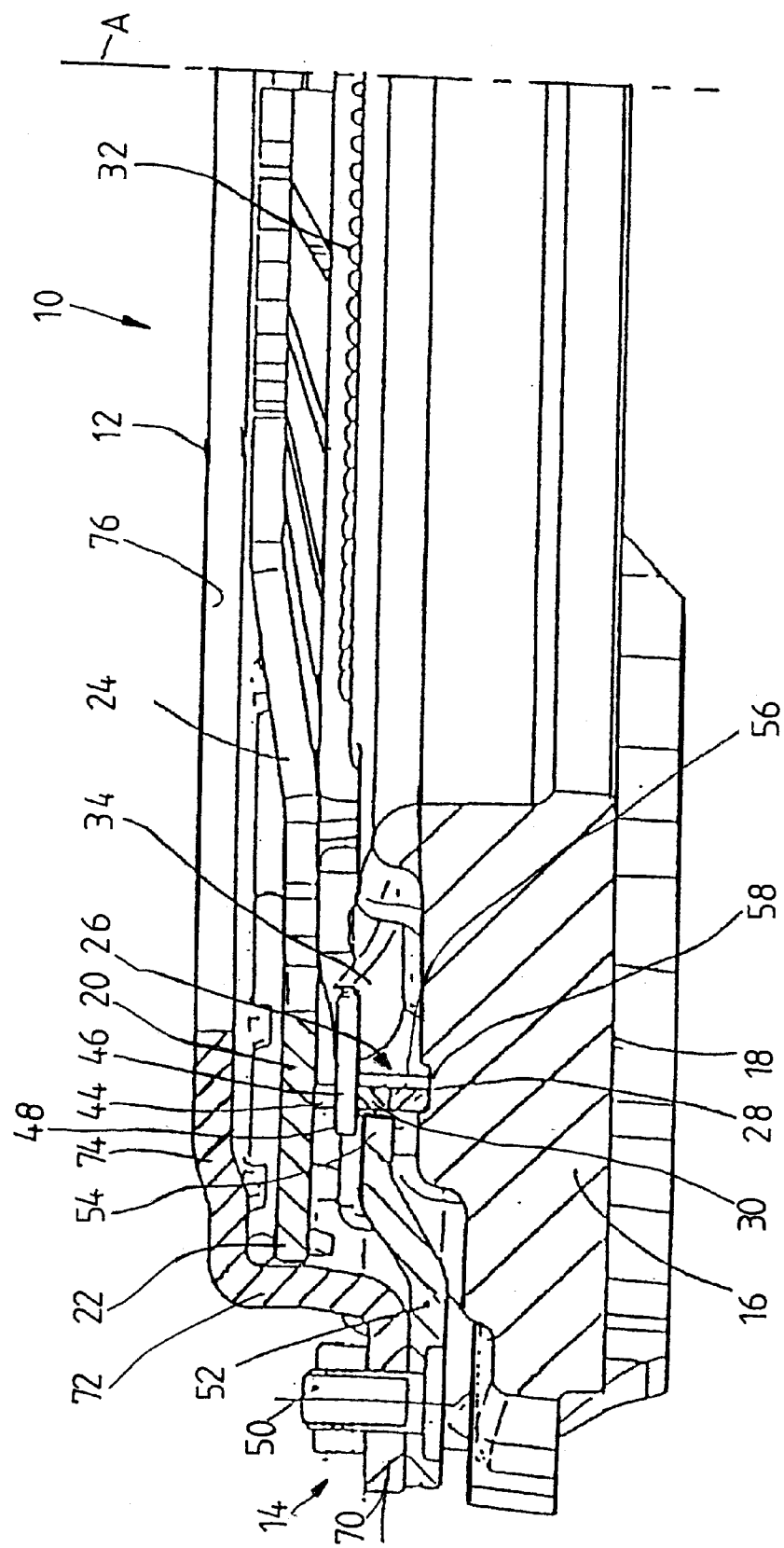
FIG. 2 is a partial longitudinal section of a pressure plate assembly according to the invention along line II—II of FIG. 1.

The pressure plate assembly 10 shown in FIGS. 1 and 2 comprises a housing 12, which is designed to be attached to a centrifugal mass arrangement, not shown in the figures, such as a single-mass flywheel or possibly a multiple-mass flywheel. Inside the housing 12, a pressure plate 16 is provided. This plate has a friction surface 18, which can be pressed against a clutch disk, not shown in the figures either, the clutch disk thus being pressed against a corresponding friction surface of the centrifugal mass arrangement. The pressure plate 16 is connected to the housing 12 by elements (not shown) such as tangential leaf springs or the like, so that it can move in the same direction as that in which a rotational axis A extends but is essentially prevented from rotating around the rotational axis A relative to the housing 12.

A stored-energy device 20 is also installed in the housing 12. The radially outer area 22 of this device is supported on the housing 12. In the radially inner area, where so-called "spring tongues" 24 are located, the device is designed to be actuated by a release mechanism with a pulling type of action. The radially intermediate area exerts force on the pressure plate 16 by way of a wear-compensating device 26, which will be described further below. It should be pointed out that a stored-energy device 20 and a pressure plate assembly 10 of the pulled type are presented only as examples; it is obvious that the stored-energy device 20 could also be supported at a point radially inside the area in which it acts via the wear-compensating device 26 on the pressure plate 16, in which case the release mechanism would exert a pushing effect on it. In the illustrated design example, the wear-compensating device 26 comprises two adjusting rings 28, 30. Adjusting ring 28 is supported on the pressure plate 16, and the adjusting ring 30 accepts the force exerted by the stored-energy device, i.e., by the diaphragm spring 20. The surfaces of the two adjusting rings 28, 30 which face each other are provided with complementary slanted or wedge-like areas, which create a wedge-like profile extending in the circumferential direction. Relative rotation of the two adjusting rings 28, 30 with respect to each other has the result that the total axial dimension of the wear-compensating device 26 is changed. The two adjusting rings 28, 30 are pretensioned for rotation with respect to each other by a helical tension spring 32 installed radially inside the adjusting rings 28, 30. One end of the spring 32 acts on the adjusting ring 28, whereas the other end acts on, for example, the pressure plate 16.

The gripping element 34 of a clearance-producing arrangement 36 is also provided on the pressure plate 16, radially inside the adjusting rings 28, 30. One of the circumferential end areas 38 of the gripping element 34 is fixed by means of a threaded bolt 40 to the pressure plate 16, while the other circumferential end area 42 of the gripping element 34 has a gripping section 46, which extends radially outward through a circumferential and axial slot 44 in the adjusting ring 30. The gripping element 34 is made of elastic material such as spring plate and is pretensioned in its installed state in such a way that it exerts axial force on the adjusting ring 30 and thus on the entire wear-compensating device 26. As a result of this pretensioning effect, the two adjusting rings 28, 30 are clamped between the gripping section 46 and the pressure plate 16, so that even the pretensioning effect of the spring 32 is unable to cause the adjusting rings 28, 30 to move relative to each other in a rotational direction such that the total axial dimension of the wear-compensating device 26 is increased.

The free end 48 of the gripping section 46 of the gripping element 34 projects over a blocking element 52, which, as will be described below, is attached to the housing 12 by means of a threaded bolt 50, for example, and extends radially inward up as far as the adjusting rings 28, 30. There is therefore a radial overlap, as can be seen especially clearly in FIG. 1, between the end area 48 and a corresponding end area 54 of the blocking element 52.

The gripping element 34 of the clearance-producing arrangement 36 is also provided with an arresting element 56. This arresting element 56 extends radially inside the adjusting rings 28, 30, i.e., rests against their inside circumferential surfaces, and is guided in a corresponding recess 58 in the pressure plate 16, in which recess the adjusting ring 28 resting on this pressure plate 16 is also guided. A second helical tension spring 62 acts on the circumferential end area 60 of the arresting element 56, while the other end of this spring is fastened or hooked to the helical tension spring 32, namely to the end of this spring which cooperates with the adjusting ring 28, which can rotate in the circumferential direction around the rotational axis A, as will be described further below. The adjusting ring 30 is essentially blocked from rotating in the circumferential direction by the gripping element 34, i.e., by its gripping section 46, which engages in the slot 44.

Starting from its end area 60 and proceeding to its free end 64, the arresting element 56 becomes larger in the axial direction; that is, it has a wedge-like shape extending in the circumferential direction between the two ends 60, 64, with the result that the smallest axial dimension is present in the area where the gripping section 46 is positioned over the arresting element 56, as shown in FIG. 1, whereas the largest axial dimension is present in the area near the end 64. Through the action of the spring 62, the arresting element 56 is thus pretensioned in the circumferential direction and forced to move until its wedge-like surface 66 strikes the gripping section 46 of the gripping element 34 and can therefore no longer move any farther in the circumferential direction.

The way in which the pressure plate assembly 10 according to the invention functions in rotational operating mode, especially upon the occurrence of wear, is described in the following.

In the new, as yet unworn state of the friction linings normally provided on the clutch disk, the two adjusting rings 28, 30 assume a predetermined relative rotational position when the pressure plate assembly 10 is assembled; in this predetermined position, the axial dimension of the wear-compensating device 26 is also the smallest because of the corresponding relative positioning of the slanted surface areas. In this position, furthermore, the spring 32 is under maximum pretension.

In this state, then, as already described, the adjusting rings 28, 30 are arrested with respect to each other by the pretensioning effect of the gripping element 34 and thus unable to rotate. In the engaged state, furthermore, the stored-energy device 20 is acting on the adjusting ring 30, with the result that the pressure plate 16, which in this situation is resting against the clutch disk, and the resulting opposing force provide another blocking effect on the two adjusting rings 28, 30, which also prevents them from moving. The blocking effect provided by the stored-energy device 20 is much stronger, however, because the stored-energy device 20 exerts a force much greater than the pretensioning force of the gripping element 34.

In this new state of the pressure plate assembly 10, it is also possible for the end section 48 of the gripping section 46 to be a certain axial distance away from the opposing end section 54 of the blocking element 52.

When now the friction linings become worn during operation, e.g., after repeated engagements and disengagements, the pressure plate 16 comes closer and closer to the centrifugal mass arrangement when in the engaged state, which, in the illustration of FIG. 2, corresponds to a movement of the pressure plate 16 in the downward direction relative to the housing 12. As this happens, the end section 48 of the gripping section 46 also moves closer to the blocking element 52. As soon as the amount of wear exceeds a certain value, the gripping section 46 is prevented from moving any farther by the blocking element 52. When additional wear then occurs, therefore, the gripping section 46 will be restrained in the axial direction by the blocking element 52 as the clutch is being engaged and thus lifted away from the adjusting ring 30 as the pressure plate 16 continues to move in the axial direction. A certain amount of axial play is thus created between the gripping section 46, which had previously being resting against the adjusting ring 30, and this adjusting ring 30. Because the stored-energy device 20 is still exerting its force on the adjusting rings 28, 30 during the clutch-engaging process and then in the engaged state, as described above, it is still impossible for any relative rotational motion to occur between the two adjusting rings 28, 30, even though the gripping element 34 is no longer exerting any blocking action. In the state in which the further movement of the gripping section 46 is blocked, the gripping section 46 would then in principle be forced to lose contact with the wedge surface 66 of the arresting element 56. But because this arresting element 56 is under the pretension of the spring 62, the arresting element is pulled into the gap which forms as soon as the rising movement of the gripping section 46 begins. The result of this is that, when a clutch-disengaging operation now occurs, in the course of which the end section 48 of the gripping section 46 rises axially again from the blocking element 52, the gripping section 46 is unable to make contact again with the wear-compensating device 26, which is still being prevented by the stored-energy device 20 from making an adjusting movement. Initially, therefore, at the beginning of the disengaging process, the clearance between the gripping section 46 and the adjusting ring 30 previously produced by wear remains.

During a subsequent clutch-disengaging process, however, the clamping action of the two adjusting rings 28, 30 relative to each other essentially disappears as a result of the elimination or reduction of the actuating force of the stored-energy device 20; whatever clamping force remains is provided at this point almost exclusively by the tangential leaf springs responsible for the return of the pressure plate 16. The axial pretensioning force of these springs, however, is comparatively weak. The adjusting ring 28 is therefore now able to move in the circumferential direction under the action of the helical tension spring 32; the adjusting ring 30 is prevented from moving in the circumferential direction by the gripping element 34. During this relative rotation between the two adjusting rings 28, 30 and the accompanying sliding movement of the various slanted surface areas along each other, the wear-compensating device 26 changes its axial dimension until the adjusting ring 30 comes to rest again against the gripping section 46. The axial dimension of the wear-compensating device 26 has thus been changed essentially to the same extent as that to which the gripping section 46 was previously raised from the adjusting ring 30, this distance corresponding in turn essentially to the extent to which the pressure plate 16 has moved closer, as a result of wear, to the centrifugal mass arrangement in the engaged state. This means ultimately that, when a compensation process such as this has been completed, the wear which has been compensated is essentially the same as that to which the clearance-producing device 36 responded previously. The result is that the axial distance between the friction surface 18 of the pressure plate 16 and the area or point at which the stored-energy device 20 acts on the wear-compensating device 26 has been increased to the same extent that the thickness of the friction lining has decreased. The installation position of the stored-energy device therefore remains unchanged, even after wear has occurred, and thus there will be no change in the engaging or disengaging force characteristic in this type of pressure plate assembly.

Hooking the spring 62 onto the end of the spring 32, which works together with the moving adjusting ring 28, has the result that, even under increasing wear and increasing circumferential movement of the arresting element 56, the spring 62 does not relax to any significant degree. Instead, it is ensured that the spring 62 is put under tension again by the movement of the adjusting ring 28 which occurs as part of the compensation process the arresting element 56 being held stationary at this time, so that, when more wear occurs, essentially the same amount of pretensioning force is still available to the arresting device for movement in the circumferential direction.

It should be pointed out that, in principle, the design of the pressure plate assembly with wear compensation which has been described above can be modified in a wide variety of ways. For example, it is possible for the wear-compensating device 26 to have only a single adjusting ring, which, when wear occurs and a compensation process is being performed, can move in the circumferential direction around rotational axis A; the slanted surface areas provided on it thus slide along complementary slanted surface areas on the pressure plate. It is also possible to provide several wear-compensating elements which are capable of moving independently of each other and which do not necessarily have to be in the form of rings. Individual wedge elements, which are actuated by associated spring arrangements and which cooperate with separate gripping elements, could also be provided.

It can be seen especially in FIG. 2 that the housing 12 of the pressure plate assembly according to the invention has an approximately ring-like structure. In a radially outer area 14, the housing 12 is designed, as previously explained, so that it can be attached to a centrifugal mass arrangement, where here, for example, a flange-like circumferential edge section can be provided, through which several threaded bolts can be inserted. In an outer area 70, the housing 12 is tightly connected to the blocking element 52 by screws. Adjacent to a housing section 72 extending approximately in the axial direction, the housing 12 has a section which ultimately forms the bottom 74 of the basically cup-like structure. In this section 74, a pass-through opening 76 is provided, through which a release mechanism is able to act on the radially inner area, i.e., on the spring tongues 24, of the stored-energy device 20.

Because, in an especially preferred embodiment of the pressure plate assembly according to the invention, a blocking element 52 is provided at only one point on the circumference, which element ultimately works together with a single gripping element 34 attached to the pressure plate 16, the assembly formed by the housing 12 and the blocking element 52, i.e., the assembly comprising essentially these two components, would in principle have such a mass distribution relative to the rotational axis A that, as a result of the existing imbalance, undesirable oscillations would occur in rotational mode. In order to prevent this, the housing 12 or the stamped sheet steel part provided to form the housing 12 is designed in such a way that, after the blocking element 52 has been attached to the housing 12, an assembly is obtained which, considered in and of itself, has essentially a mass distribution relative to the rotational axis A which essentially eliminates the possibility of imbalances in rotational operating mode.

Figure 3:
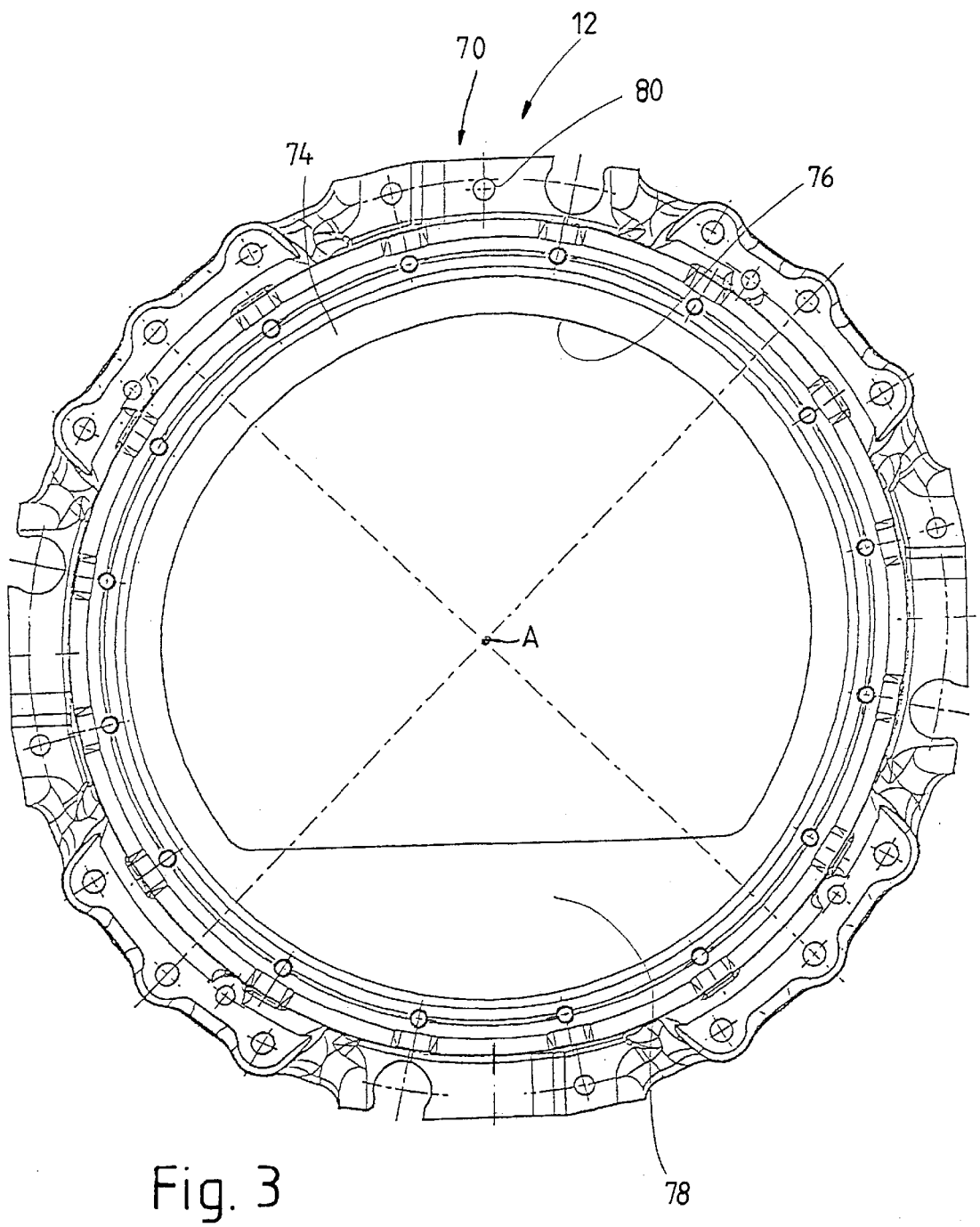
FIG. 3 is an axial view of a first embodiment of a housing arrangement according to the invention.

As can be seen in FIG. 3, for example, this shape or mass distribution can be obtained by giving the pass-through opening 76 a shape or circumferential outline which is neither rotationally nor radially symmetric. This can be achieved, for example, by providing material or allowing material to remain in the area 78 of the bottom section 74, so that the pass-through opening 76, which otherwise has a circular outline, is cut off at the bottom in the view of FIG. 3, and thus ultimately acquires the contour or shape of a segment of a circle. In the area of the housing 12 diametrically opposite the section 78 with respect to the rotational axis A, the blocking element 52 is then fixed in place by passing the threaded bolt 50 through the opening or hole 80 in the housing 12. The additional weight which is introduced by the blocking element 52 and the components serving to hold it in place and also by the required shape of the housing 12 are therefore compensated by the section 78 of the bottom area 74. It is thus possible to obtain an essentially imbalance-free assembly, which does not require any additional balancing measures on the assembly itself, simply by providing the pass-through opening 76 with an appropriate shape, which, of course, without violating the principles of the invention, can also have a peripheral outline which deviates from an exact circle in the areas outside section 78.

To achieve a further optimization of the operation of a pressure plate assembly according to the invention such as that shown in FIG. 2, i.e., to reduce the stress on the individual components, especially the tangential leaf springs (not shown), which connect the pressure plate 16 to the housing 12, the assembly comprising the pressure plate 16, the wear-compensating device 26, the springs 32, 62, and the gripping element 34 or the threaded bolts 40 is designed in such a way that its mass distribution eliminates any imbalance during rotational operating mode; the absence of an uneven mass distribution thus means that no oscillations will occur. When this assembly is then attached to the assembly comprising the housing 12 and the blocking element 52, a pressure plate assembly with only minor residual imbalances is obtained already. These minor imbalances can be corrected by conventional balancing measures, with the result that there is no need for the tangential leaf springs to transmit excessive imbalance-compensating forces during operation.

Figure 4:
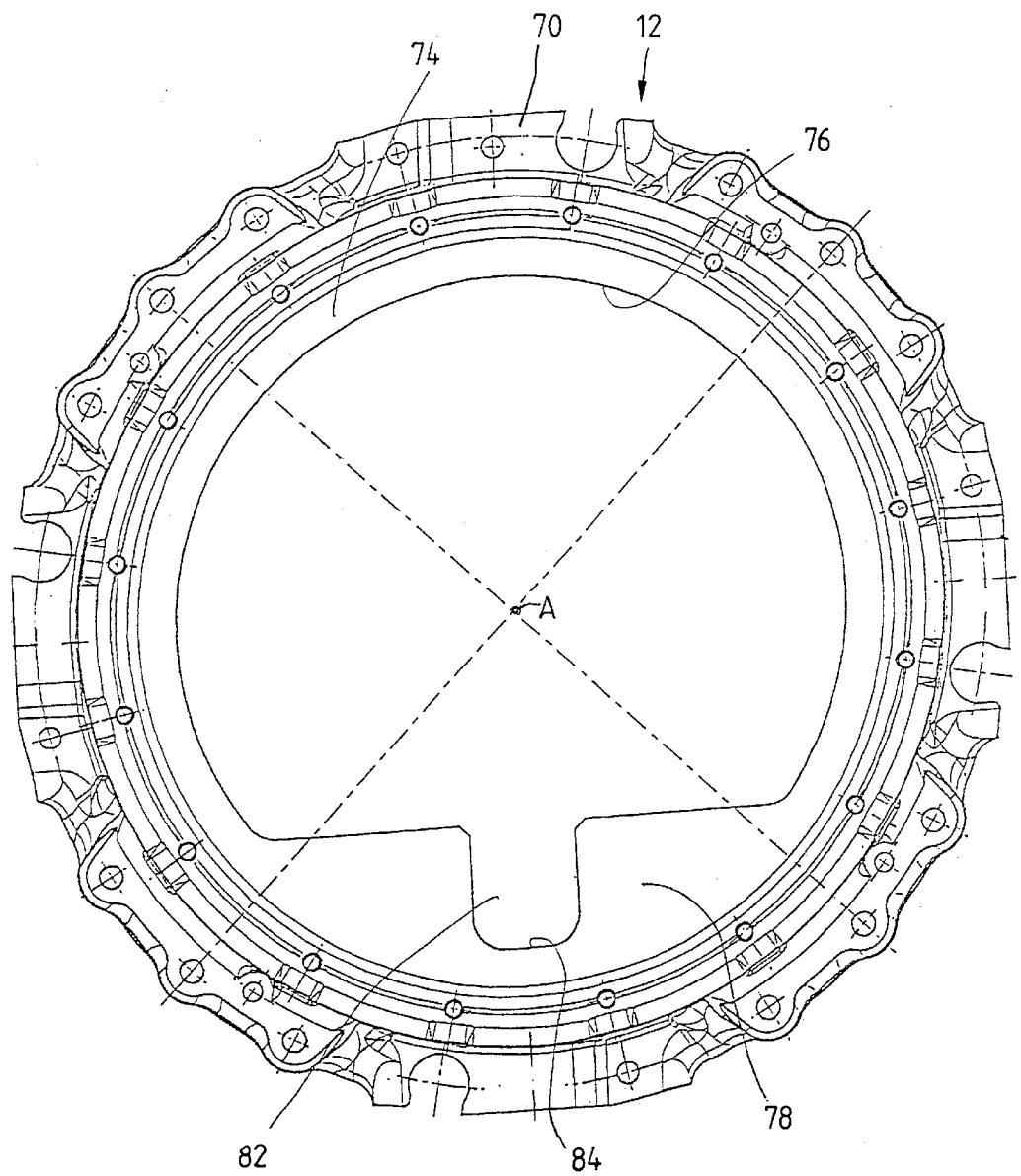
FIG. 4 is a view similar to that of FIG. 3 of an alternative design of the housing arrangement according to the invention.

FIG. 4 shows a modified design variant of the housing 12 according to the invention. It can be seen that, in the section 78 of the bottom area 74 serving to compensate for the imbalance, a notch 82 connected to the main area of the pass-through opening 76 is provided. The circumferential boundary 84 of this notch situated radially on the outside with respect to the rotational axis A lies on the same circle as the circumferential outline of the main pass-through opening 76. This produces a housing configuration which makes it possible for the housing to be easily clamped in a multi-jaw chuck, such as a four-jaw chuck, during the production process or even during the process of putting together the pressure plate assembly. But even in this case, the imbalance introduced by the attachment of the blocking element 52 can be compensated from the very start by an integral component of the housing 12 itself by giving the section 78 of the bottom area 74 an appropriate shape and size, i.e., by giving the pass-through opening 76 a shape which is neither rotationally nor radially symmetric with respect to the rotational axis A.

In the case of a pressure plate assembly or housing arrangement according to the invention, it is also possible, of course, to subject this assembly to a balancing procedure and to compensate for any residual imbalances remaining in this assembly by a metal-removing process or by the attachment of balancing weights after the housing 12 has been attached to the blocking element 52.

It remains to be pointed out that the principle of the present invention of imbalance compensation by appropriate shaping of the housing arrangement is independent of the special design of the clearance-producing arrangement, of the gripping element, or of the wear-compensating device. The descriptions of the clearance-producing arrangement and the wear-compensating device given in conjunction with FIGS. 1 and 2 are therefore to be considered merely examples. The principle of the present invention can be applied to any type of housing or to any type of pressure plate assembly in which an imbalance is produced as a result of the attachment of a motion stop for a clearance-producing arrangement on the housing. In addition, it is obvious that the present invention can also be applied when, in addition to or instead of a motion stop, other mass parts introducing imbalances are to be attached to a housing or to a housing arrangement. In this case, it is obvious that the shapes of the pass-through openings 76 required to compensate for each of the individual imbalances can be superimposed on each other to arrive at an appropriately complex shape for the pass-through opening 76 which will compensate for the total amount of imbalance.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A housing arrangement for a pressure plate assembly of a friction clutch, said housing arrangement comprising a substantially ring-shaped housing having a rotational axis, said housing comprising a radially outer area for attachment to a centrifugal mass arrangement and a pass-through opening for allowing a release mechanism to cooperate with a stored energy device, and at least one mass part provided on the housing, said at least one mass part introducing a corresponding at least one rotational imbalance on said housing arrangement, said pass-through opening being shaped to provide an imbalance compensating formation on said housing, said formation at least substantially compensating for said at least one rotational imbalance.

2. A housing arrangement as in claim 1 wherein said at least one mass part comprises a blocking element for a clearance producing arrangement of the pressure plate assembly.

3. A housing arrangement as in claim 1 wherein said pass-through opening has a shape which is not rotationally symmetric to said axis and which is not radially symmetric to said axis.

4. A housing arrangement as in claim 1 wherein said pass-through opening is shaped approximately as a segment of a circle.

5. A pressure plate assembly for a friction clutch, comprising a housing having a rotational axis, a radial outside area, and a pass-through opening for allowing a release mechanism to cooperate with a stored energy device, a pressure plate assembly mounted in said housing with freedom to move axially relative to said housing, at least one blocking element fixed to said radial outside area of said housing, said at least one blocking element introducing a corresponding at least one rotational imbalance on said housing, at least one clearance producing arrangement cooperating with said at least one blocking element on said housing to detect wear, and an imbalance compensating formation on said housing radially inside of said at least one blocking element the pass through opening being shaped to provide the imbalance compensation formation said formation at least substantially compensating for said at least one rotational imbalance, wherein a first assembly comprising said housing and said at least one blocking element is at least substantially free of imbalance, and a second assembly comprising said pressure plate and said clearance producing arrangement is substantially free of imbalance, said pressure plate being balanced to eliminate any residual imbalance after said first assembly and said second assembly have been attached.

6. A friction clutch comprising a pressure plate assembly, said pressure plate assembly comprising a housing having a rotational axis, a radial outside area, and a pass-through opening for allowing a release mechanism to cooperate with a stored energy device, a pressure plate assembly mounted in said housing with freedom to move axially relative to said housing, at least one blocking element fixed to said radial outside area of said housing, said at least one blocking element introducing a corresponding at least one rotational imbalance on said housing, at least one clearance producing arrangement cooperating with said at least one blocking element on said housing to detect wear, and an imbalance compensating formation on said housing radially inside of said at least one blocking element, the pass through opening being shaped to provide the imbalance compensation formation said formation at least substantially compensating for said at least one rotational imbalance.

* * * * *